United States Patent
Hong Min

(10) Patent No.: US 7,559,610 B1
(45) Date of Patent: Jul. 14, 2009

(54) ODOR AIR CLEANING SEAT

(76) Inventor: Kim Hong Min, 100 Crockford Boulevard, Scarborough, Ontario (CA) M1R 3C3

( * ) Notice: Subject to any disclaimer, the term of this patent is extended or adjusted under 35 U.S.C. 154(b) by 0 days.

(21) Appl. No.: 12/075,163

(22) Filed: Mar. 11, 2008

(51) Int. Cl.
*A47C 7/74* (2006.01)

(52) U.S. Cl. ............................... 297/452.42; 297/180.1; 297/217.3

(58) Field of Classification Search ............ 297/452.42, 297/452.43, 180.1, 180.11, 180.13, 180.14, 297/217.2, 452.44, 452.45, 452.46, 452.47
See application file for complete search history.

(56) References Cited

U.S. PATENT DOCUMENTS

| | | | | |
|---|---|---|---|---|
| 3,101,488 A | * | 8/1963 | Peebles | 5/423 |
| 5,450,894 A | * | 9/1995 | Inoue et al. | 165/43 |
| 6,003,950 A | * | 12/1999 | Larsson | 297/452.42 |
| 6,048,024 A | * | 4/2000 | Wallman | 297/180.14 |
| 6,578,910 B2 | * | 6/2003 | Andersson et al. | 297/180.11 |
| 6,926,601 B2 | * | 8/2005 | Aoki et al. | 454/121 |
| 7,261,371 B2 | * | 8/2007 | Thunissen et al. | 297/180.14 |
| 2005/0200166 A1 | * | 9/2005 | Noh | 297/180.14 |

FOREIGN PATENT DOCUMENTS

JP 09206173 * 8/1997

* cited by examiner

*Primary Examiner*—David Dunn
*Assistant Examiner*—Patrick Lynch
(74) *Attorney, Agent, or Firm*—David W. Wong

(57) ABSTRACT

An odor air cleaning seat is provided with an opening for receiving body waste odor air expelled by a person sitting thereon. A odor air sensor is mounted in the opening for detecting the presence of odor air expelled by the person. An odor filter is mounted in a conducting compartment located below the seat. At least one air blower is provided in the conducting compartment for drawing the odor air to flow through the conducting compartment for cleaning and removing the offensive odor of the odor air.

8 Claims, 3 Drawing Sheets

ODOR AIR CLEANING SEAT

BACKGROUND OF THE INVENTION

1. Field of the Invention

This invention relates to a seat construction operative for the cleaning and removing of body waste odor air expelled by a person sitting thereon.

2. Background Art

The body waste odor gas expelled by a person breaking wind is very offensive and it contaminates the air quality of the atmosphere in the vicinity around the person. It is particularly offensive in an enclosed atmosphere of a compartment for instance in the cabin of an automobile, or a boat, or in any room of a house or an office building and the like in which the air space is restricted or air ventilation is inefficient; so that the offensive odor air would not dissipate for a considerable length of time. The offensive odor air may be removed from a room or compartment by improving the air ventilation of the room; however, ventilation means are normally located far from the person expelling the odor air, thus the offensive odor air must travel a relatively long distance from the person to the air ventilating means. Therefore, the offensive odor air may still disperse in the atmosphere and be detected and offending other people in the immediate area around the person expelling the odor air.

SUMMARY OF THE INVENTION

It is a principal object of the present invention to provide a seat in which odor air expelled by a person seated thereon may be removed and cleaned immediate from the expelling source so as to prevent it from pervading into the atmosphere around the person.

It is another object of the present invention is to provide a seat which is operative either automatically or manually for removing and cleaning odor waste air expelled by a person seating thereon.

It is another object of the present invention to provide a seat in which the components parts are readily accessible for easy repair or replacement.

BRIEF DESCRIPTION OF THE DRAWINGS

The invention is described in connection with the embodiments illustrated in the following drawings in which.

DETAILED DESCRIPTION OF THE PREFERRED EMBODIMENTS

Figure 1:
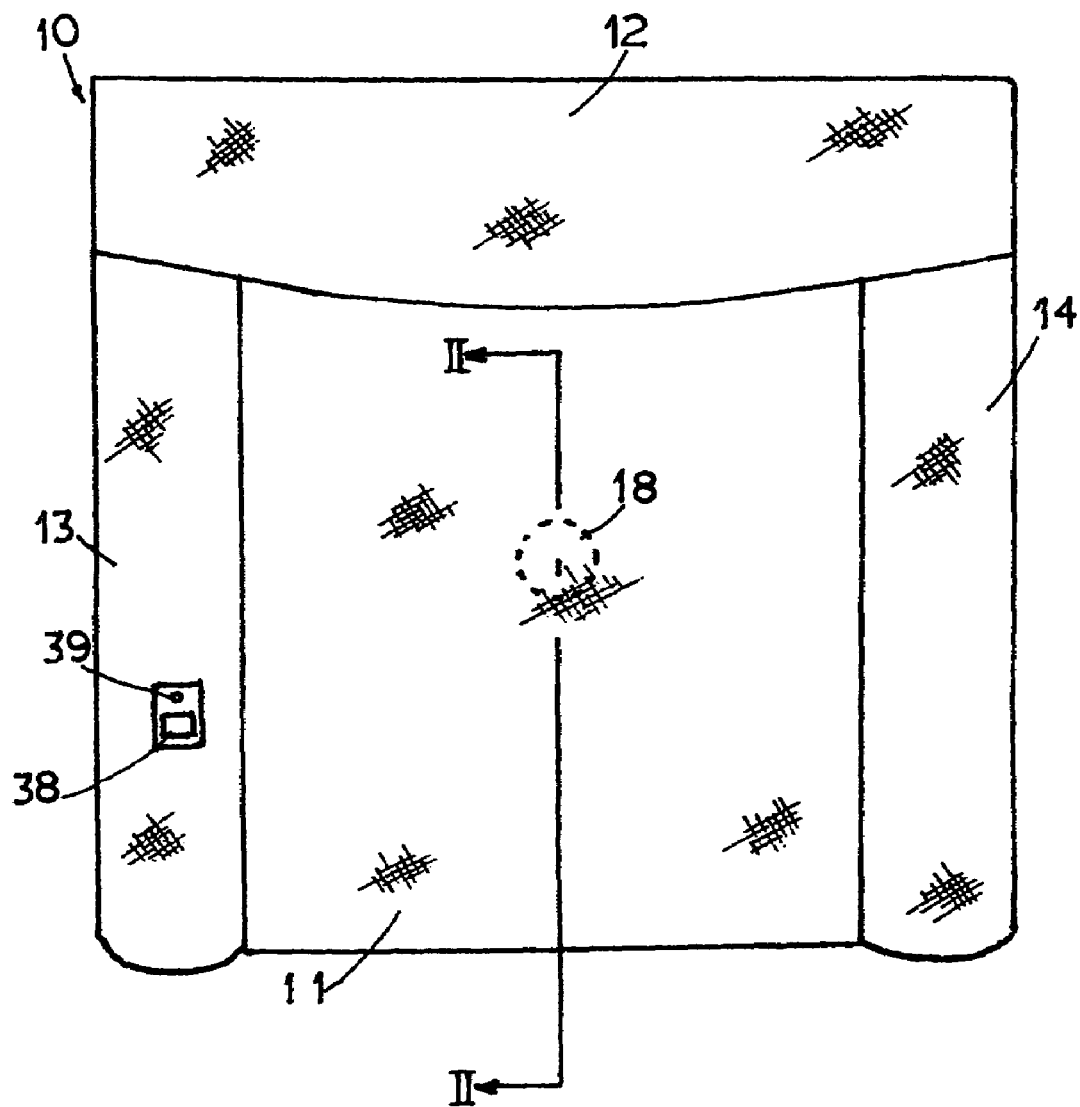
FIG. 1 is a top elevation view of the seat according to the present invention.
Figure 2:
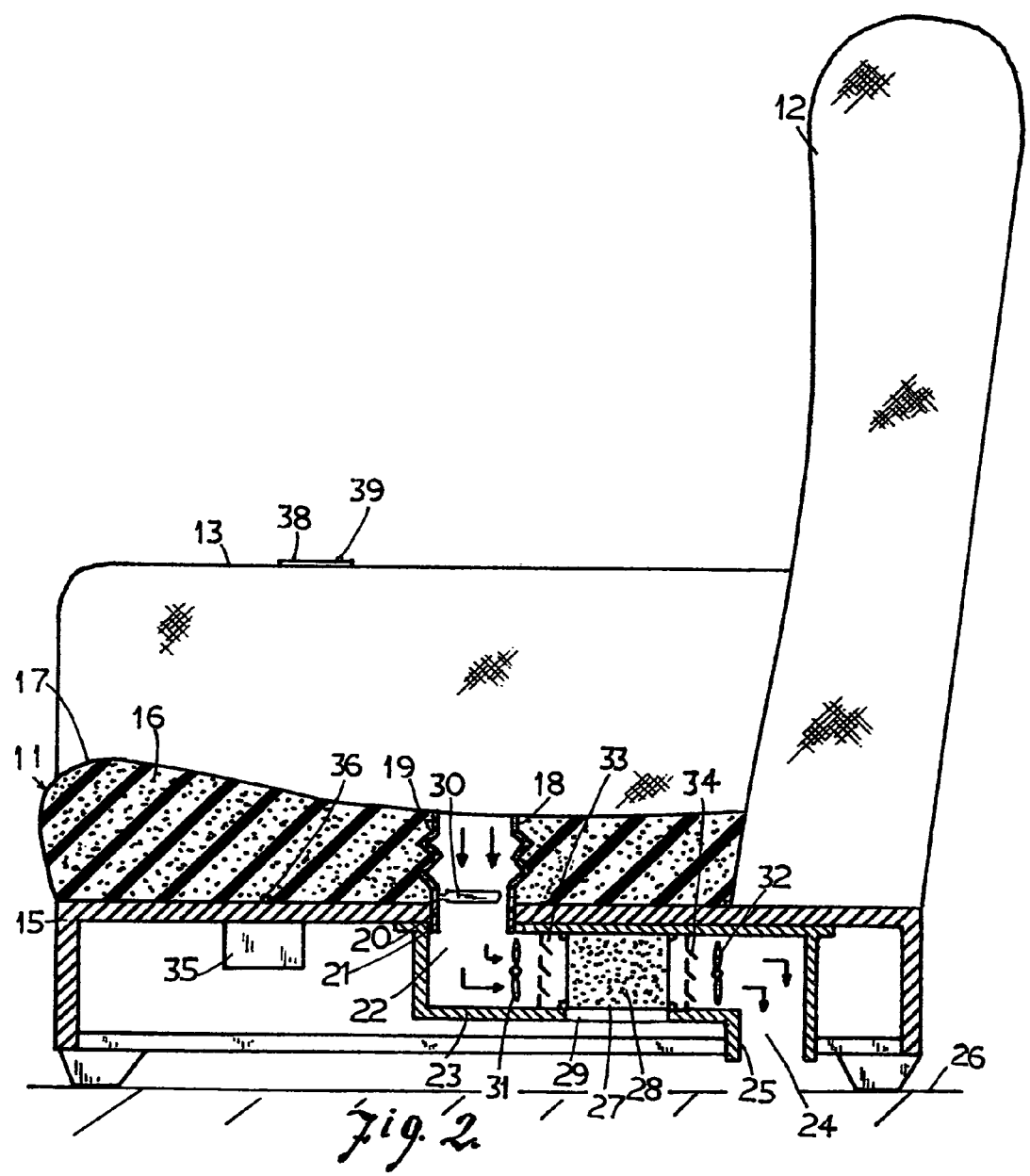
FIG. 2 is a partial sectional side elevation view along section line II-II of FIG. 1.
Figure 3:
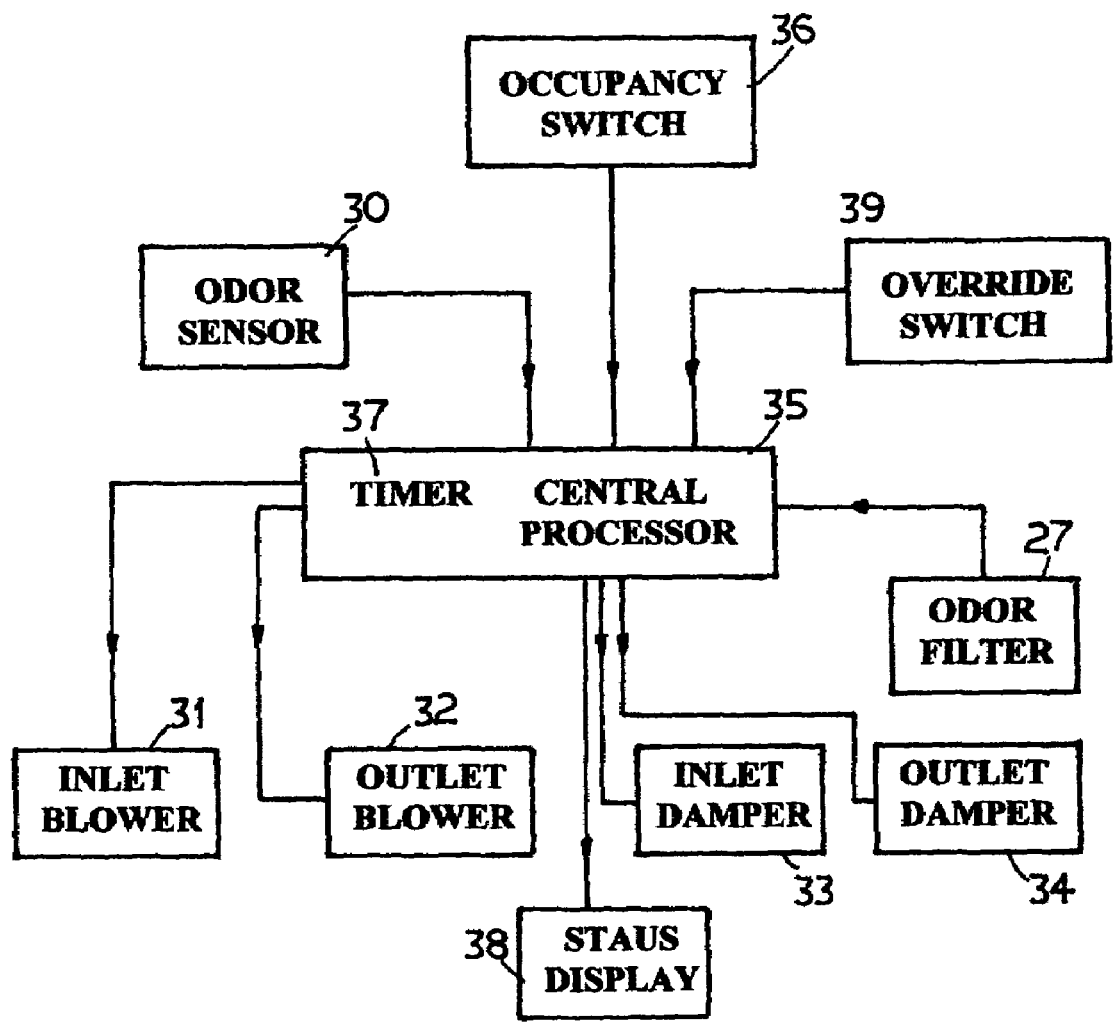
FIG. 3 is a schematic block diagram of the components of the odor air cleaning and removing system of the seat.

With reference to the drawings in which like reference numeral designate corresponding parts in the various different views, the seat or chair 10 of the present invention has a seat portion 11 and a back rest portion 12. Two arm rests 13 and 14 may be provided. As best shown in FIG. 2, the seat portion 11 has a supporting frame 15 with a foam-like resilient cushion material 16 disposed on top of a top panel the seat portion 11 to provide a comfortable support for a person sitting on the seat portion 11. The supporting frame 15 is opened at the underside. The seat portion 11 and the back rest portion 12 are preferably covered with a breathable fabric material 17 which allows air to pass freely therethrough. A through receiving opening 18 is formed at a generally central position of the foam-like resilient material 17 and the top panel of the supporting frame 15 such that it is located directly under the anus of the person sitting on the seat portion 11. A telescopic tube 19 is mounted vertically within the receiving opening 18 such that it could contract and expand vertically with the resilient material 16 under the weight of the person sitting on the seat without the person feeling its presence. The lower end 20 of the telescopic tube 19 is coupled to a vertical mounting collar 21 of an inlet end 22 an air conducting compartment 23 mounted below the top panel of the supporting frame 15 and located directly under the seat portion 11. The conducting compartment 23 has an outlet end 24 with an outlet collar 25 extending preferably downward towards the supporting floor 26 below the chair 10. An odor filter 27 is removably and snugly mounted in the conducting compartment 23. The filter 27 is filled with an odor cleaning and absorbing material 28 such as active charcoal. The offensive odor of odor air passing through the filter 27 will be cleaned and absorbed by the active charcoal. The filter 27 may be mounted or removed from an access opening 29 through the opened underside of the seat supporting frame 15. An odor sensor 30 such as an ammonia sensor is mounted in the telescopic tube 19 for sensing the presence of any odor air expelled by the person sitting on the seat 10.

An inlet blower 31 is mounted at the inlet portion of the conducting compartment 23 and it is operative for drawing any odor air from the telescopic tube 19 to pass through the conducting compartment 23 and the odor filter 27. An outlet blower 32 may additionally be mounted at the outlet portion of the conducting compartment 23 and it is operative for providing additionally force for efficiently drawing the odor air to passing through the conducting compartment 23 and to push the cleaned air to emit from the outlet end 24 of the conducting compartment 23 back to the atmosphere.

An inlet damper 33 is provided between the inlet blower 31 and the filter 27 to ensure that the odor air would not flow backward but only forwardly through the conducting compartment 23. An additional outlet damper 34 may also be provided between the filter 27 and the outlet blower 32 to ensure the forward flow of the cleaned air to exit through the outlet end 24 of the conducting compartment 23. The inlet damper 33 and the outlet damper 34 may also be electrically operable by the control module 35 to maintain them in a completely closed condition for sealing the odor filter 27 from communicating with the outside atmosphere when the seat is not in operation so as to maintain the maximum efficiency of active odor cleaning characteristics of the odor absorption material 28 of the odor filter 27.

The operation of the seat is controlled by a control module 35 which is automatically activated by an occupancy switch 36 mounted between the cushion material 16 and the top panel of the supporting frame 15 of the seat 10. When a person sits on the seat 10, the person's weight would automatically cause the occupancy switch 36 to turn on the control module 35 and the odor sensor 30. When the odor sensor 30 detects the presence of odor air expelled by the person sitting on the seat 10, the central processor of the control module 35 will turn on the inlet blower 31 and the outlet blower 32 to draw the odor air to flow through the conducting compartment 23 so that the offensive odor of the odor air will be cleaned and absorbed by the charcoal material. The cleaned air will then be released back to the atmosphere through the outlet end 24.

A timer 37 of the control module 35 will maintained the inlet blower 31 and the outlet blower 32 operating as long as that the odor sensor 30 still detecting the presence of odor air even after the occupancy switch 36 has detected that the person has left the seat 10. This would ensure that all residual odor air is drawn through the conducting compartment 23 to be cleaned by the filter 27.

An electronic display 38 is operative by the control module 35 to show the various operating status of the control module, the odor sensor, the inlet blower and the outlet blower as well as the condition of the odor filter 27 of whether it is operating normally or requiring replacement. The display 38 may be conveniently located on top of either arm rest 13 or 14 or alternatively on the side of the seat 10.

A manually operative override switch 39 is operative for actuating or de-actuating the control module 35 at the option determined by the user.

While the present invention has been shown and described in the preferred embodiment thereof, it will be apparent that various modifications can be made therein without departing from the spirit or essential attribute thereof, it is desired therefore that only such limitations be placed thereon as are imposed by the appended claims.

What is claimed is:

1. An odor air cleaning seat comprising,
   a supporting frame having a top panel and an opened bottom,
   a seat portion made of a resilient cushion material disposed on said top panel,
   an vertical opening formed in said resilient cushion material and said top panel of said supporting frame, and adapted to be located directly below the anus of a person sitting on said seat,
   a telescopic tubing mounted in said vertical opening, and being vertically compressible and expandable with said cushion material under the weight of said person,
   an air breathable material covering over said seat portion,
   an odor sensor mounted in said tubing and operative to detect body waste odor air expelled by said person,
   a conducting compartment mounted underneath said top panel of said supporting frame, said conducting compartment having an inlet end coupled to a lower end of said tubing,
   an inlet blower mounted in said inlet end and operative to draw said odor air to flow through said conducting compartment,
   an odor filter mounted in said conducting compartment and being operative for cleaning and removing offensive odor of said odor air flowing therethrough,
   said conducting compartment having an outlet end for releasing clean and filtered air out of said seat,
   an inlet damper located between said inlet blower and said odor filter for preventing said odor air from flowing backward to said inlet end of said conducting compartment.

2. An odor air cleaning seat according to claim 1 wherein said odor filter is removable from said conducting compartment through said opened bottom of said supporting frame for replacement purposes.

3. An odor air cleaning seat according to claim 2 including an outlet blower mounted in said outlet end of said conducting compartment and operative to provide additional force for drawing said odor air to flow through said conducting compartment.

4. An odor air cleaning seat according to claim 3 including an outlet damper located between said odor filter and said outlet blower for preventing said odor air from flowing backward of said conducting compartment.

5. An odor air cleaning seat according to claim 4 including a control module mounted to said supporting frame and operative to control operations of said inlet blower and said outlet blower.

6. An odor air cleaning seat according to claim 5 including an electronic display connected to said control module for indicating operations of said inlet blower, said outlet blower and condition of said odor filter.

7. An odor air cleaning seat according to claim 6 including an occupancy sensor mounted between said cushion material and said top panel of said supporting frame and operative to detect presence of said person sitting on said seat portion for actuating said control module.

8. An odor air cleaning seat according to claim 7 including a manual override switch connected to said control module and operative for selectively actuating and terminating operation of said inlet blower and said outlet blower.

* * * * *